(12) United States Patent
Yang et al.

(10) Patent No.: US 8,619,654 B2
(45) Date of Patent: Dec. 31, 2013

(54) BASE STATION SELECTION METHOD FOR HETEROGENEOUS OVERLAY NETWORKS

(75) Inventors: Xiangying Yang, Portland, OR (US); Muthaiah Venkatachalam, Beaverton, OR (US); Yuan Zhu, Beijing (CN)

(73) Assignee: Intel Corporation, Santa Clara, CA (US)

(*) Notice: Subject to any disclaimer, the term of this patent is extended or adjusted under 35 U.S.C. 154(b) by 260 days.

(21) Appl. No.: 12/977,797

(22) Filed: Dec. 23, 2010

(65) Prior Publication Data

US 2012/0039226 A1 Feb. 16, 2012

Related U.S. Application Data

(60) Provisional application No. 61/373,788, filed on Aug. 13, 2010.

(51) Int. Cl.
  *G08C 17/00* (2006.01)
  *G01R 31/08* (2006.01)
  *H04W 4/00* (2009.01)

(52) U.S. Cl.
  USPC .............. 370/311; 370/252; 370/328

(58) Field of Classification Search
  None
  See application file for complete search history.

(56) References Cited

U.S. PATENT DOCUMENTS

| | | | |
|---|---|---|---|
| 7,391,776 B2 | 6/2008 | Venkatachalam et al. |
| 7,414,976 B2 | 8/2008 | Venkatachalam et al. |
| 7,499,426 B2 | 3/2009 | Venkatachalam |
| 7,548,507 B2 | 6/2009 | Pandoh et al. |
| 7,633,904 B2 | 12/2009 | Venkatachalam |
| 7,636,577 B2 | 12/2009 | Mohanty et al. |
| 7,693,555 B2 | 4/2010 | Srinivasan et al. |
| 7,720,490 B2 | 5/2010 | Venkatachalam |
| 7,725,115 B2 | 5/2010 | Venkatachalam |
| 7,746,896 B2 | 6/2010 | Venkatachalam |
| 7,782,817 B2 | 8/2010 | Yang et al. |
| 7,787,891 B2 | 8/2010 | Taaghol et al. |
| 7,804,799 B2 | 9/2010 | Venkatachalam et al. |
| 7,809,355 B2 | 10/2010 | Mohanty et al. |
| 7,826,404 B2 | 11/2010 | Puthenkulam et al. |
| 7,852,794 B2 | 12/2010 | Venkatachalam |
| 7,860,469 B2 | 12/2010 | Mohanty et al. |
| 7,885,210 B2 | 2/2011 | Yang et al. |

(Continued)

FOREIGN PATENT DOCUMENTS

WO 2012021357 A1 2/2012

OTHER PUBLICATIONS

Search Report and Written Opinion from corresponding International application No. PCT/US2011/046464, filed Aug. 3, 2011; ISR mailed Jan. 10, 2012; 10 pages.

(Continued)

*Primary Examiner* — Jutai Kao
(74) *Attorney, Agent, or Firm* — Carrie A. Boone, P.C.

(57) ABSTRACT

A base station selection method is disclosed to select between two base stations for connecting a mobile device in a wireless neighborhood to a network. The wireless neighborhood may support multiple carriers and multiple radio access technologies. The base station selection method performs mobility estimation of the mobile device, where possible, to perform cell selection, but is also capable of performing cell selection without knowing the mobility of the device. Considerations such as the battery level of the mobile device, traffic demands of the network, and load balancing of network resources are used to make optimal selections for the mobile device as it travels through the wireless neighborhood.

15 Claims, 7 Drawing Sheets

(56) References Cited

U.S. PATENT DOCUMENTS

| | | |
|---|---|---|
| 7,907,572 B2 | 3/2011 | Yang et al. |
| 7,911,936 B2 | 3/2011 | Mohanty et al. |
| 7,912,134 B2 | 3/2011 | Rengarajan et al. |
| 7,912,491 B2 | 3/2011 | Mohanty et al. |
| 2005/0010676 A1 | 1/2005 | Venkatachalam et al. |
| 2005/0129020 A1 | 6/2005 | Doyle et al. |
| 2006/0221978 A1 | 10/2006 | Venkatachalam |
| 2007/0086434 A1 | 4/2007 | Venkatachalam et al. |
| 2007/0087767 A1 | 4/2007 | Pareek et al. |
| 2007/0097205 A1 | 5/2007 | Venkatachalam |
| 2007/0104132 A1 | 5/2007 | Rajagopalan et al. |
| 2007/0105567 A1 | 5/2007 | Mohanty et al. |
| 2007/0105600 A1 | 5/2007 | Mohanty et al. |
| 2007/0121567 A1 | 5/2007 | Venkatachalam et al. |
| 2007/0191031 A1 | 8/2007 | Mohanty et al. |
| 2007/0245025 A1 | 10/2007 | Venkatachalam |
| 2007/0259692 A1 | 11/2007 | Venkatachalam |
| 2007/0298806 A1 | 12/2007 | Venkatachalam |
| 2008/0014981 A1 | 1/2008 | Venkatachalam |
| 2008/0019312 A1 | 1/2008 | Venkatachalam et al. |
| 2008/0037460 A1 | 2/2008 | Venkatachalam |
| 2008/0037480 A1 | 2/2008 | Venkatachalam |
| 2008/0056219 A1 | 3/2008 | Venkatachalam |
| 2008/0080371 A1 | 4/2008 | Liu et al. |
| 2008/0084814 A1 | 4/2008 | Venkatachalam |
| 2008/0096614 A1 | 4/2008 | Venkatachalam |
| 2008/0101285 A1 | 5/2008 | Venkatachalam et al. |
| 2008/0107092 A1 | 5/2008 | Taaghol et al. |
| 2008/0108321 A1 | 5/2008 | Taaghol et al. |
| 2008/0108336 A1 | 5/2008 | Venkatachalam et al. |
| 2008/0151789 A1 | 6/2008 | Venkatachalam et al. |
| 2008/0159220 A1 | 7/2008 | Kitchin et al. |
| 2008/0214213 A1 | 9/2008 | Etemad et al. |
| 2008/0219189 A1 | 9/2008 | Kitchin et al. |
| 2008/0219216 A1 | 9/2008 | Taaghol et al. |
| 2008/0232288 A1 | 9/2008 | Venkatachalam et al. |
| 2008/0232401 A1 | 9/2008 | Ahmadi et al. |
| 2008/0259835 A1 | 10/2008 | Venkatachalam et al. |
| 2008/0279127 A1 | 11/2008 | Venkatachalam et al. |
| 2008/0279136 A1 | 11/2008 | Taaghol et al. |
| 2008/0310381 A1 | 12/2008 | Taaghol et al. |
| 2008/0310386 A1 | 12/2008 | Venkatachalam |
| 2008/0311881 A1 | 12/2008 | Taaghol et al. |
| 2008/0311891 A1 | 12/2008 | Venkatachalam et al. |
| 2008/0311909 A1 | 12/2008 | Taaghol et al. |
| 2008/0311931 A1 | 12/2008 | Venkatachalam et al. |
| 2009/0003255 A1 | 1/2009 | Mohanty et al. |
| 2009/0003285 A1 | 1/2009 | Mohanty et al. |
| 2009/0034526 A1 | 2/2009 | Ahmadi et al. |
| 2009/0040970 A1 | 2/2009 | Ahmadi et al. |
| 2009/0154457 A1 | 6/2009 | Kolekar et al. |
| 2009/0168745 A1 | 7/2009 | Ahmadi et al. |
| 2009/0168907 A1 | 7/2009 | Mohanty et al. |
| 2009/0274105 A1 | 11/2009 | Choi et al. |
| 2009/0290555 A1 | 11/2009 | Alpert et al. |
| 2009/0323602 A1 | 12/2009 | Li et al. |
| 2009/0323770 A1 | 12/2009 | Venkatachalam et al. |
| 2010/0005354 A1 | 1/2010 | Zhu et al. |
| 2010/0008325 A1 | 1/2010 | Hartman et al. |
| 2010/0056154 A1 | 3/2010 | Venkatachalam |
| 2010/0056182 A1 | 3/2010 | Venkatachalam |
| 2010/0103825 A1 | 4/2010 | Taaghol et al. |
| 2010/0111047 A1 | 5/2010 | Yang et al. |
| 2010/0128704 A1 | 5/2010 | Taaghol et al. |
| 2010/0157820 A1 | 6/2010 | Cheng et al. |
| 2010/0157906 A1 | 6/2010 | Yang et al. |
| 2010/0166183 A1 | 7/2010 | Johnston et al. |
| 2010/0172291 A1 | 7/2010 | Kim et al. |
| 2010/0172318 A1 | 7/2010 | Zhu et al. |
| 2010/0173631 A1 | 7/2010 | Kim et al. |
| 2010/0195621 A1 | 8/2010 | Kekki et al. |
| 2010/0208831 A1 | 8/2010 | Zhu et al. |
| 2010/0226311 A1 | 9/2010 | Yang et al. |
| 2010/0226357 A1 | 9/2010 | Li et al. |
| 2010/0227565 A1 | 9/2010 | Sun et al. |
| 2010/0227618 A1 | 9/2010 | Yang et al. |
| 2010/0272033 A1 | 10/2010 | Fwu et al. |
| 2010/0272047 A1 | 10/2010 | Zhu et al. |
| 2010/0273435 A1 | 10/2010 | Sun et al. |
| 2010/0275085 A1 | 10/2010 | Venkatachalam et al. |
| 2010/0279717 A1 | 11/2010 | Venkatachalam et al. |
| 2010/0316030 A1 | 12/2010 | Venkatachalam et al. |
| 2010/0329316 A1 | 12/2010 | Sun et al. |
| 2010/0331000 A1 | 12/2010 | Zhu et al. |
| 2011/0002239 A1 | 1/2011 | Venkatachalam |
| 2011/0002263 A1 | 1/2011 | Zhu et al. |
| 2011/0002280 A1 | 1/2011 | Davydov et al. |
| 2011/0002297 A1 | 1/2011 | Jain et al. |
| 2011/0002298 A1 | 1/2011 | Venkatachalam et al. |
| 2011/0002299 A1 | 1/2011 | Venkatachalam |
| 2011/0003591 A1 | 1/2011 | Venkatachalam et al. |
| 2011/0004747 A1 | 1/2011 | Venkatachalam |
| 2011/0004760 A1 | 1/2011 | Sharaga et al. |
| 2011/0044183 A1 | 2/2011 | Huang et al. |
| 2011/0044213 A1 | 2/2011 | Venkatachalam et al. |
| 2011/0044229 A1 | 2/2011 | Etemad et al. |
| 2011/0044307 A1 | 2/2011 | Mohanty et al. |
| 2011/0045763 A1 | 2/2011 | Mohanty et al. |
| 2011/0047289 A1 | 2/2011 | Venkatachalam et al. |
| 2011/0058522 A1 | 3/2011 | Xu et al. |
| 2011/0058531 A1 | 3/2011 | Jain et al. |
| 2011/0064158 A1 | 3/2011 | Li et al. |
| 2011/0070849 A1 | 3/2011 | Mohanty et al. |
| 2011/0070867 A1 | 3/2011 | Venkatachalam et al. |
| 2011/0075619 A1 | 3/2011 | Sun et al. |
| 2011/0075623 A1 | 3/2011 | Venkatachalam et al. |
| 2011/0075650 A1 | 3/2011 | Zhu et al. |
| 2011/0096737 A1 | 4/2011 | Venkatachalam et al. |
| 2012/0287859 A1* | 11/2012 | Ji et al. .......................... 370/328 |

OTHER PUBLICATIONS

Srinivasan, et al., "Sleep-mode wireless cell reselection Apparatus, systems, and methods", U.S. Appl. No. "12/650,157", filed Dec. 30, 2009, pp. 1-24.

Venkatachalam, et al., "Techniques for Timing Optimization in Wireless Networks That Utilize a Universal Services Interface", U.S. Appl. No. "13/082,505", filed Apr. 8, 2011, pp. 1-19.

Venkatachalam, et al., "Techniques for Timing Optimization in Wireless Networks That Utilize a Universal Services Interface", U.S. Appl. No. "13/006,605", filed Jan. 14, 2011.

Venkatachalam, et al., "Techniques Utilizing Step Size Adaptation for Differential Beamforming in Wireless Networks", U.S. Appl. No. "12/655,258", filed Dec. 28, 2009, pp. 1-12.

Yang, et al., "Coordinating broadcast operations in a mobile wireless network with Overlaid cells", U.S. Appl. No. "12/633,853", filed Dec. 9, 2009, pp. 1-27.

Venkatachalam, "Femtocell Architecture and Network", U.S. Appl. No. "12/645,045", filed Dec. 22, 2009, pp. 1-18.

Bergman, "Techniques Utilizing ARQ Feedback for Efficient Transmitter Buffer Usage", U.S. Appl. No. "12/890,020", filed Sep. 24, 2010, pp. 1-26.

Chen et al., "Techniques Using Differential Recoding for Highly Correlated Channels in Wireless Networks", U.S. Appl. No. "12/757,109", filed Apr. 9, 2010, pp. 1-21.

Venkatachalam, et al., "Wireless Device and Method for Efficiently Paging Idle-mode Mobile Stations in Multicarrier Systems", U.S. Appl. No. "12/862,120", filed Aug. 24, 2010, pp. 1-19.

Venkatachalam, "Airlink Techniques Enabling Dynamic Optimization and Configuration of Wireless Network Base Stations", U.S. Appl. No. "12/906,488", filed Oct. 18, 2010, pp. 1-18.

Yang, et al., "Security Update Procedure for Zone Switching in Mixed-Mode Wimax Network", U.S. Appl. No. "12/855,400", filed Aug. 12, 2010, pp. 1-35.

Li et al., "Method and Device for Implicit Relay", U.S. Appl. No. "12/781,472", filed May 17, 2010, pp. 1-22.

Sharaga, et al., "Neighbor List Broadcasting Techniques", U.S. Appl. No. "12/914,097", filed Oct. 28, 2010, pp. 1-29.

Venkatachalam, et al., "Distributed Control Architecture for Relays in Broadband Wireless Networks", U.S. Appl. No. "12/889,938", filed Sep. 24, 2010, pp. 1-33.

(56) References Cited

OTHER PUBLICATIONS

Venkatachalam, et al,. "Cell Reselection Mechanism for a Base Station with Closed Subscriber Group",U.S. Appl. No. "12/886,764", filed Sep. 21, 2010, pp. 1-27.
Yang, et al., "Techniques to Assign Identifiers in a Wireless Network", U.S. Appl. No. "12/851,756", filed Aug. 6, 2010, pp. 1-19.
Venkatachalam et al., "Enhancing Fragmentation and Defragmentation Procedures in Broadband Wireless Networks", U.S. Appl. No. "12/889,346", filed Sep. 23, 2010, pp. 1-28.
Venkatachalam, et al., "Apparatus and Methods for Upgrading an Airlink in a Wireless System", U.S. Appl. No. "12/890,179", filed Sep. 24, 2010, pp. 1-25.
Yang, et al., "Techniques to assign multiple identifiers in a Wireless Network", U.S. Appl. No. "12/851,841", filed Aug. 6, 2010, pp. 1-29.
Yang. et al., "Relay Data Path Architecture for a Wireless Network", U.S. Appl. No. "12/872,808", filed Aug. 31, 2010, pp. 1-27.
Venkatachalam, "Managing Interference Due to Low Power BSs", U.S. Appl. No. "12/889,025", filed Sep. 23, 2010, pp. 1-25.
Venkatachalam, "Mechanisms to Update a Serving Base Station With the CSG Memberships of a Mobile Station", U.S. Appl. No. "12/911,394", filed Oct. 25, 2010, pp. 1-20.
Shan, et al., "Wimax Voip Service Architecture", U.S. Appl. No. "12/940,288", filed Nov. 5, 2010, pp. 1-40.
Zhu et al., "Combined Channel State Information and Combined Channel Quality Indicator in Wireless Communication Systems", U.S. Appl. No. "12/873,006", filed Aug. 31, 2010, pp. 1-27.
Li et al., "OFDM Transmitter and Methods for Reducing the Effects of Severe Interference With Symbol Loading", U.S. Appl. No. "12/889,651", filed Sep. 24, 2010, pp. 1-32.
Li et al., "Communication Station and Method for Efficiently Providing Channel Feedback for Mimo Communications", U.S. Appl. No. "12/861,685", filed Aug. 23, 2010, pp. 1-30.
Venkatachalam, et al., "Legacy and Advanced Access Service Network Internetworking", U.S. Appl. No. "12/889,285", filed Sep. 23, 2010, pp. 1-25.
Zhu, et al., "Techniques for formatting signals for transmission using a wireless network", U.S. Appl. No. "12/962,045", filed Dec. 7, 2010, pp. 1-30.
Zhu et al., "Control Channel Interference Mitigation", U.S. Appl. No. "12/971,701", filed Dec. 7, 2010, pp. 1-21.
Yang, et al., "Uplink Power Headroom Calculation and Reporting for Ofdma Carrier Aggregation Communication System", U.S. Appl. No. "12/889,318", filed Sep. 23, 2010, pp. 1-20.
Chou et al., "System and Method of Protecting Mac Control Messages", U.S. Appl. No. "13/094,387", filed Apr. 26, 2011, pp. 1-31.
Chou et al., "MPDU Structure and Related Methods for Use in a Wireless Communications Protocol", U.S. Appl. No. "13/071,878", filed Mar. 25, 2011, pp. 1-28.
Zhu, et al., "Physical Uplink Control Channel Interference Mitigation in Heterogenous Networks", U.S. Appl. No. "12/930,001", filed Dec. 23, 2010, pp. 1-32.
Zhu, et al., "Configurable Common Rerfernce Signal Port for Reference Signal Received Power in Distributed Antenna Systems", U.S. Appl. No. "12/928,758", filed Dec. 17, 2010, pp. 1-16.
Zhang et al., "Apparatus and Methods of Time Domain Multiplexing Solutions for In-Device Coexistance", U.S. Appl. No. "13/077,745", filed on Mar. 31, 2011, pp. 1-39.
Balakrishnan et al., "Method and Apparatus to Facilitate Mobile Relay and Group Mobility", U.S. Appl. No. "13/049,530", filed Mar. 16, 2011, pp. 1-48.
Gupta et al., "Wireless Metropolitan Area Network Service Over Wireless Local Area Network", U.S. Appl. No. "13/073,904", filed Mar. 28, 2011, pp. 1-24.
Zhu et al., "PMI Feedback With Codebook Interpolation", U.S. Appl. No. "13/077,905", filed Mar. 31, 2011, pp. 1-35.
Zhu et al., "Enhanced Node B and Method for Precoding With Reduced Quantization Error", U.S. Appl. No. "13/075,320", filed Mar. 30, 2011, pp. 1-37.
Yang et al., "Seamless Cell Reconfiguration in Broadband Wireless Networks", U.S. Appl. No. "13/041,373", filed Mar. 5, 2011, pp. 1-29.
Yang et al., "Contention-Based Transmission With Contention-Free Feedback for Reducing Latency in Lte Advanced Networks and Enhanced Pucch", U.S. Appl. No. "13/041,125", filed Mar. 4, 2011, pp. 1-21.
Yang et al., "Handover Between Legacy and Non-Legacy Wimax Networks", U.S. Appl. No. "13/041,371", filed Mar. 5, 2011, pp. 1-27.
International preliminary report on Patentability received for PCT Application No. PCT/US2011/046464 mailed on Feb. 28, 2013, 7 pages.

\* cited by examiner

BASE STATION SELECTION METHOD FOR HETEROGENEOUS OVERLAY NETWORKS

CROSS-REFERENCE TO RELATED APPLICATIONS

This application claims priority to U.S. Provisional Patent Application No. 61/373,788, entitled, "ADVANCED WIRELESS COMMUNICATION SYSTEMS AND TECHNIQUES, filed on Aug. 13, 2010.

TECHNICAL FIELD

This application relates to heterogeneous overlay networks and, more particularly, to seamlessly transfer a mobile station between two carriers in a heterogeneous overlay network.

BACKGROUND

The Institute of Electrical and Electronics Engineers (IEEE) has adopted a set of standards for wireless local area networks (WLANs), known as 802.11, as well as a set of standards for wireless metropolitan area networks (WMANs), known as 802.16. Wireless products satisfying the 802.11 and 802.16 standards are currently on the market, for example. The term, WiFi, describes equipment satisfying the 802.11 standard. The term, WiMAX, short for worldwide interoperability for microwave access, describes equipment satisfying the 802.16 standard.

Currently being developed is an 802.16m standard, known also as "4G", "LTE-advanced", (where "LTE" means "long-term evolution") and "advanced air interface", which supports data rates of 100 megabits/second mobile and 1 gigabit/second fixed. Under the advanced air interface standard, heterogeneous networks, or "overlay networks", with potentially different cell sizes or even different radio access technologies (RAT) may be co-located in the deployment. This gives an extra degree of freedom for mobility and cell selection optimization, which was previously only based on the downlink signal strength.

Thus, there is a continuing need to provide optimal mobile station support as it travels through a heterogeneous overlay network.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a base station selection method is disclosed to select between two base stations for connection to a mobile device in a wireless neighborhood. The wireless neighborhood may support multiple carriers and multiple radio access technologies. The base station selection method performs mobility estimation of the mobile device, where possible, to perform cell selection, but is also capable of performing cell selection without knowing the mobility of the device. Considerations such as mobile station battery level, traffic demands, and load balancing are used to make optimal selections for the mobile device as it travels through the wireless neighborhood.

Figure 1:
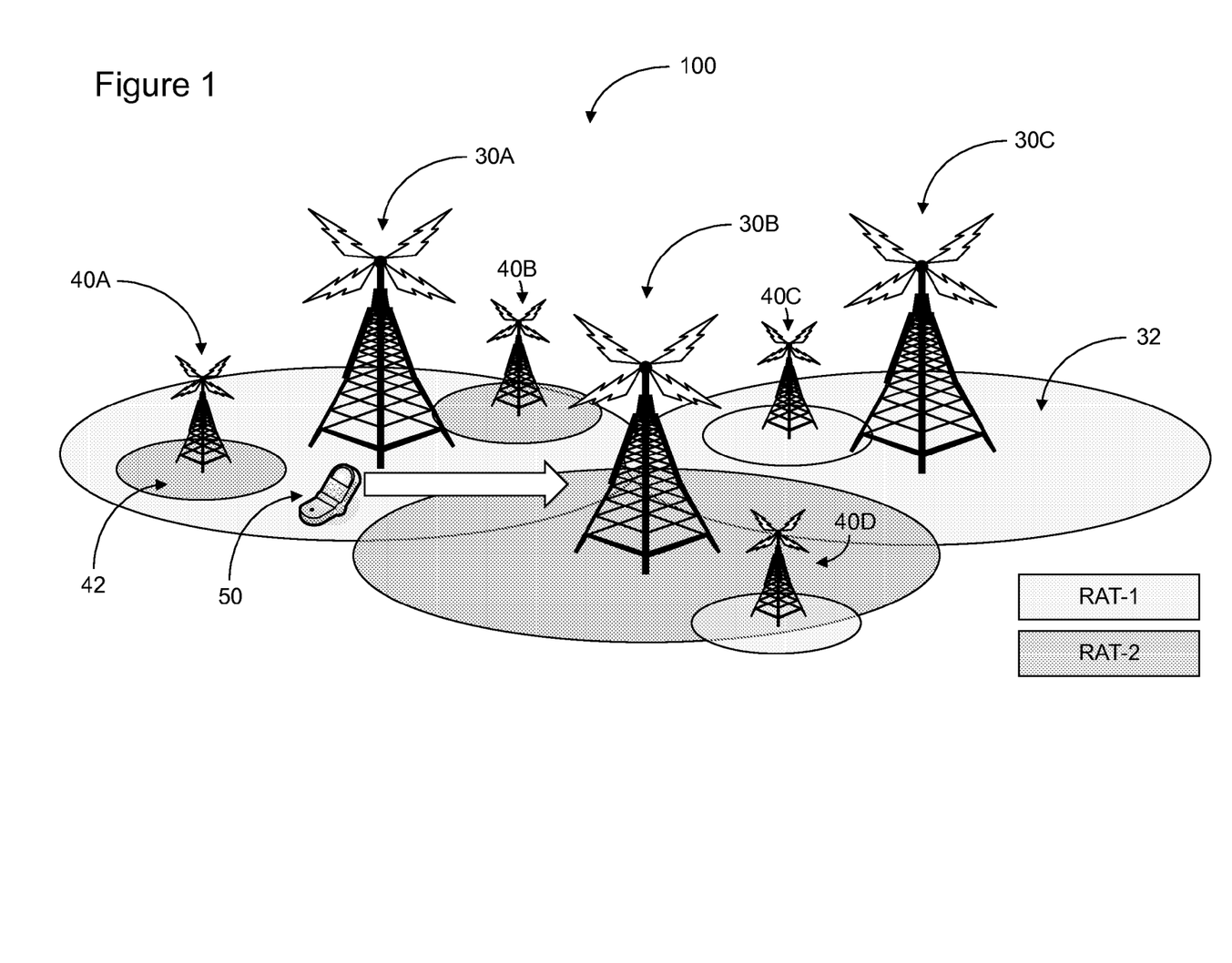
FIG. 1 is a schematic block diagram of a heterogeneous overlay network in a wireless neighborhood, according to some embodiments.

FIG. 1 is a schematic block diagram of a wireless neighborhood 100, according to some embodiments, for connecting a mobile device 50 to a wireless network. In the wireless neighborhood 100, a first set of base stations 30A, 30B, and 30C (collectively, "base stations 30") and a second set of base stations 40A, 40B, 40C, and 40D (collectively, "base stations 40"), are simultaneously available to a mobile device 50 that travels through the wireless neighborhood. Each base station 30, 40 has an associated coverage area 32, 42, respectively. As shown, the cell coverage areas 32 of each base station 30 overlaps with the respective cell coverage areas 42 of each base station 40, and even overlaps other base stations of the same type (e.g., cell coverage area 42 of base station 30A overlaps with cell coverage 42 area of base station 30B).

The base stations 30 appear to be larger than the base stations 40. The base stations 30 are known as macro cells and the base stations 40 are known as pico cells. In addition to generally being larger than pico cells, macro cells 30 are defined as those base stations that provide seamless mobility coverage. One example of such macro cells is a base station with a large coverage area, such as one supporting all kinds of mobile device users, from pedestrians to users on a high-speed train. In contrast, pico cells 40 are defined herein as those base stations that provide low-mobility support, such as one supporting mainly stationary/pedestrian mobile users (hotspot coverage). Macro cells 30 provide seamless mobility coverage, while pico cells 40 provide hotspot coverage or additional capacity enhancement. Although macro cells 30 are depicted in FIG. 1 as being larger than pico cells 40, there may be exceptions in which the macro cells are smaller than the pico cells.

Note that the pico cells 40 may or may not be separated base stations from those macro cell base stations 30. That is, a single macro cell base station may have a small cell coexisting within its cell coverage area (as denoted schematically by ovals surrounding the base station tower). For example, in FIG. 1, the cell coverage area of the base station 30A of the wireless neighborhood 100 includes two pico cells 40A and 40B; the base station 30B includes one pico cell 40D partially overlapping its coverage area; and the coverage area of the base station 30C includes one pico cell 40C.

In addition to having both macro cells 30 and pico cells 40, the wireless neighborhood 100 may also consist of different carriers. A carrier is a particular frequency in which the base station operates. Thus, in FIG. 1, some base stations may operate on a first carrier frequency (e.g., 2.4 GHz with a 40 MHz bandwidth) while other base stations operate on a second carrier frequency (e.g., 700 MHz with a 22 MHz bandwidth).

In some embodiments, both the macro cells 30 and the pico cells 40 operate under the same carrier. The presence of both macro cells and pico cells provides more widespread coverage in the wireless neighborhood 100, particularly in locations where the macro cell coverage areas 32 leave coverage "holes". In other embodiments, the macro cells 30 and the pico cells operate under different carriers.

Further, the wireless neighborhood 100 may support different radio access technologies (RATs). There are several radio access technologies available to the mobile device 50, including, but not limited to, universal mobile telephone system (UMTS), long-term evolution (LTE), wireless local area network (WLAN), ultra-mobile broadband (UMB), high-speed packet access (HSPA), wideband code division multiple access (WCDMA), worldwide interoperability for microwave access (WiMAX). As used herein, the term "RAT" is intended to encompass any of these technologies and more, in other words, any type of wireless access technology. Where the wireless neighborhood 100 supports different RAT technologies simultaneously, the wireless neighborhood is known as a heterogeneous overlay network.

The mobile station or mobile device 50 may remain in a single location in the wireless neighborhood 100, or may travel through the wireless neighborhood, as indicated by the arrow. Although the mobile device 50 is depicted as a cellular phone, the mobile device 50 may instead be a smart phone, a personal digital assistant, a laptop computer, or other portable device that includes the 802.16m advanced air interface features. As used herein, the terms, "mobile station", "mobile device", "mobile device 50", or "mobile station 50" are not meant to be limited to a single mobile device type, but may represent any device that supports the advanced air interface standard. In the figures, the acronym, MS, is used to describe the mobile device.

The base station that connects the mobile device 50 to the wireless network is known as its serving base station. Where the mobile device 50 has the capability to operate under either a macro cell 30 or a pico cell 40, there are a number of possible scenarios for which base station may be deemed its serving base station as the mobile device travels through the wireless neighborhood 100. In the past, the selection of an optimum carrier and base station within the carrier was based only on the downlink signal strength. There are reasons why this limited approach may not be optimal for the mobile device 50, as described in more detail below.

Figure 2:
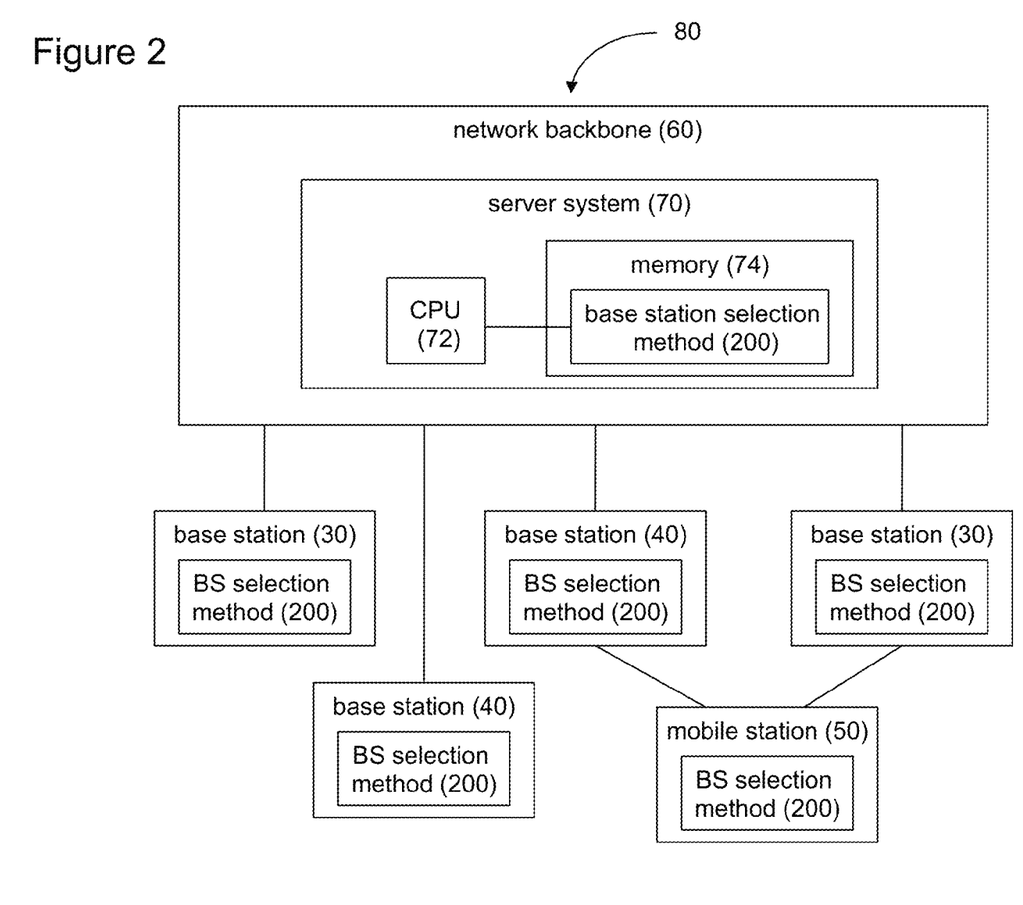
FIG. 2 is a block diagram of a base station selection method executed in a wireless network and/or mobile station, according to some embodiments.

FIG. 2 is a block diagram of a base station selection method 200 operable in a network 80, according to some embodiments. The network 80 includes the base stations 30 and 40 as well as the mobile station 50 featured in FIG. 1. A network backbone 60 includes a server system 70, a processor-based system for executing the base station selection method 200. The server system 70 includes a central processing unit (CPU) 72 and a memory 74. Once the base station selection method 200 is loaded into the memory 74, it is executable by the CPU 72. The base station selection method 200 optimally selects one of the base stations 30, 40 from the wireless neighborhood 100 for connecting the mobile station 50 to the network 80.

In addition to being executable in the network server 60, some portion of the base station selection method 200 may also be executed in a distributed fashion among the base stations 30, 40. Or, the base station selection method 200 may be run in the mobile station 50. In IEEE 802.16m, both base station-initiated handover (for which the method 200 is run in the network backbone 60 or in the base stations 30, 40) and mobile station-initiated handover (for which the method 200 is run in the mobile station 50) are allowed.

Figure 3:
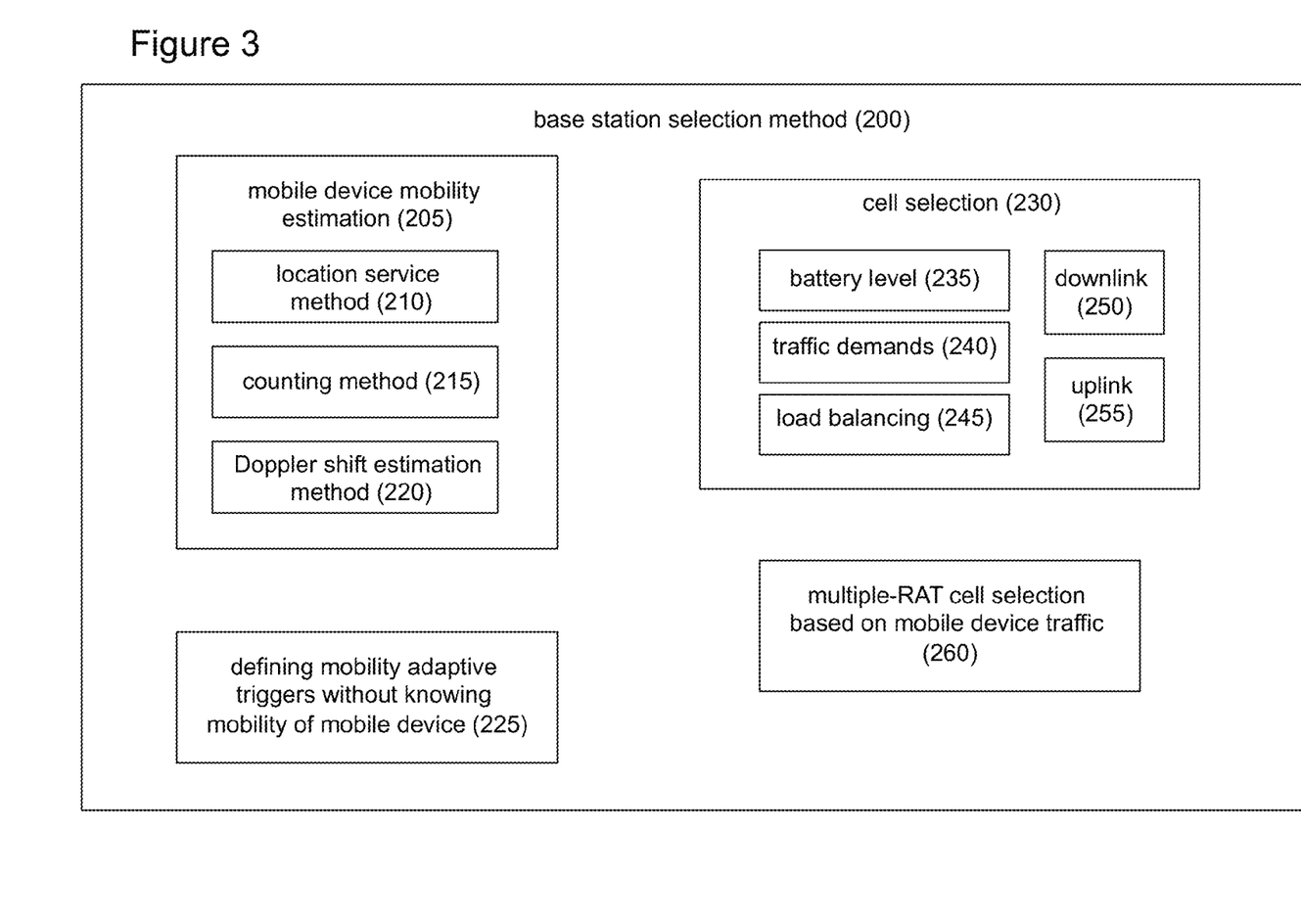
FIG. 3 is a block diagram of a base station selection method, according to some embodiments.

FIG. 3 is a block diagram of a base station selection method 200, according to some embodiments. As a mobile device 50 travels through the wireless neighborhood 100, the base station selection method 200 chooses whether to perform a handover operation of the mobile device from a macro cell 30 to a pico cell 40, or vice-versa (e.g., change its serving base station), based on a number of criteria. The base station selection method 200 is operable in both single-carrier networks and in heterogeneous overlay networks, such as the wireless neighborhood 100 of FIG. 1.

In its simplest implementation, the base station selection method 200 determines the location of the mobile device 50, either explicitly or implicitly, then selects a serving base station based on the device location. In other implementations, other considerations such as battery level of the mobile device 50 as well as traffic demands and load balancing of the wireless neighborhood 100 are considered before selecting a serving base station. While the base station selection method 200 creates a single access point for simpler wireless networks, both single access and dual access (in which the mobile device 50 uses a first base station for downlink transactions and a second base station for uplink transactions and thus has two serving base stations) are possible in heterogeneous overlay networks.

In some embodiments, the base station selection method 200 performs mobile station mobility estimation 205, using either a GPS method 210, a counting method 215, or a Doppler shift estimation method 220. Where the base station selection method 200 is unable to estimate the mobility of the mobile device 50, mobility adaptive triggers 225 may be defined without knowing the mobility of the device. Once either the mobility estimation of the device 50 is known or the mobility adaptive triggers are defined, the base station selection method 200 performs cell selection 230. In addition to being affected by whether the transmission is an uplink 255 or a downlink 250 transmission, the cell selection 230 also considers the battery level 235 of the mobile station 50, the traffic demands 240 of the network, and load balancing 245. Finally, the base station selection method 200 performs multiple-RAT cell selection based on mobile device traffic 260 in heterogeneous overlay networks. Several example wireless neighborhoods and implementations of the base station selection method 200 are described herein.

Where the base station selection method 200 indicates that a pico cell 40 is a good candidate for handover, there may be additional consideration for cell selection. In some embodiments, the macro cells 30 have higher transmit power than the pico cells 40. Thus, the downlink throughput of the macro cells 30 may be better than that of the pico cells 40, even if the mobile device 50 is closer to one of the pico cells. On the other hand, in the uplink, it may be desirable to use pico cells 40, since better uplink throughput may be achieved given fixed mobile station transmit power, allowing the mobile station to use less power and thus save battery life.

Figure 4:
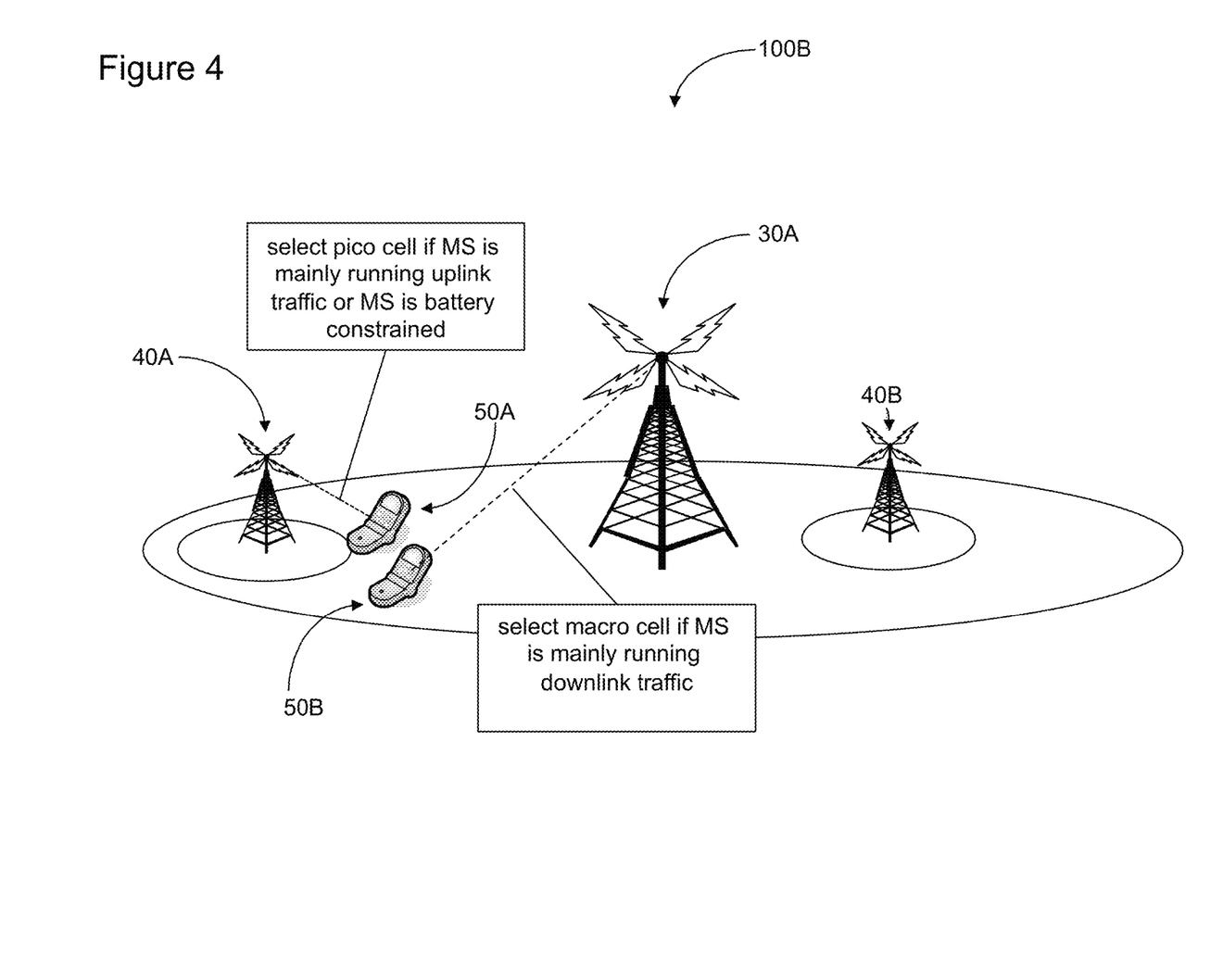
FIG. 4 is a schematic block diagram of a simplified wireless neighborhood, according to some embodiments.

FIG. 4 is a schematic block diagram of a simplified wireless neighborhood 1008, according to some embodiments. As with the heterogeneous overlay network of FIG. 1, the wireless neighborhood 1008 has coexisting macro cells 30 and pico cells 40 available to the mobile devices 50A and 50B. Both the macro cells 30 and the pico cells 40 are presumed to operate under a single radio access technology.

The mobile device 50A uses the pico cell 40A as its serving base station because either the device is battery constrained or is mostly running uplink traffic. The mobile device 50B attaches to the macro cell 30A as its serving base station because the device is mostly running downlink traffic (and is not battery constrained).

Figure 5:
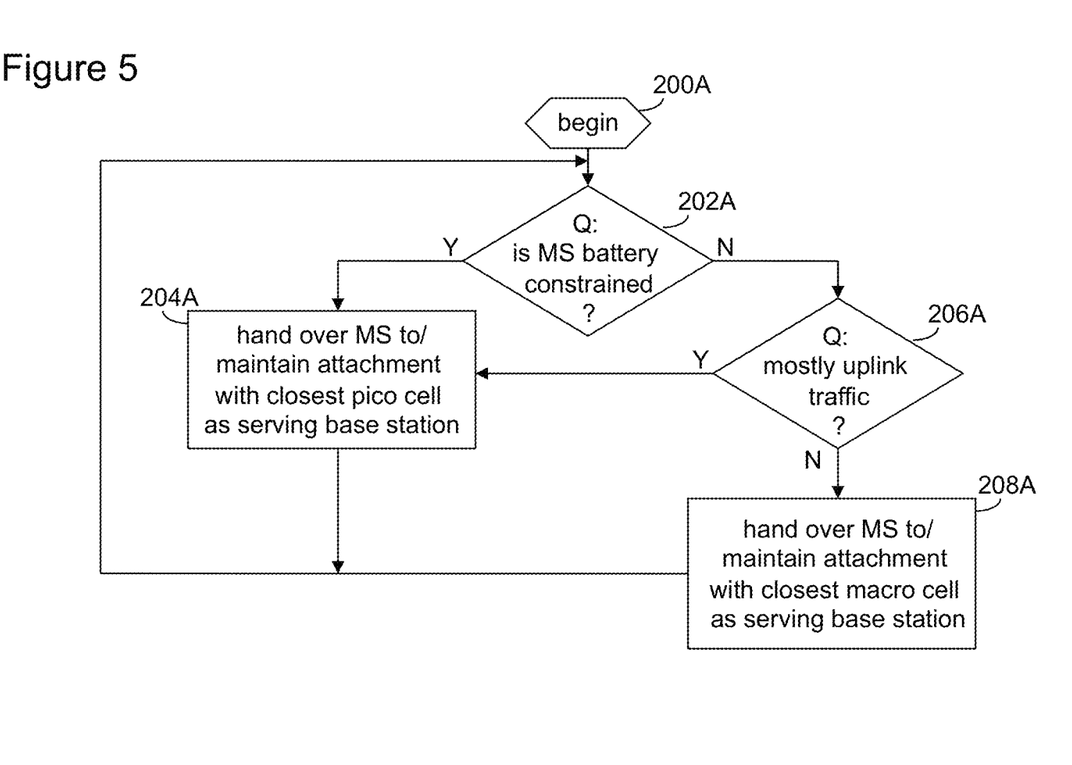
FIG. 5 is a flow diagram illustrating operations performed by the base station selection method of FIG. 2 in performing simplified cell selection, according to some embodiments.

FIG. 5 is a flow diagram showing operation of the base station selection method 200 operating in the simplified wireless neighborhood 100B of FIG. 4, according to some embodiments. Where the mobile station 50 is battery constrained (block 202A), the base station selection method 200 either hands the mobile station over to or maintains a connection to the nearest adjacent pico cell 40 (block 204A). If the battery is not constrained, a determination is made whether the mobile station 50 is mostly receiving downlink transactions or issuing uplink transactions (block 206A). If the traffic is mostly downlink, attachment with the macro cell 30 is maintained or a handover from the current serving pico cell to the nearest macro cell 30 occurs (block 208A). Otherwise, the nearest pico cell 40 is the appropriate serving base station (block 204A), since the mobile station 50 is mostly engaging in uplink operations. Once the serving base station is either maintained or changed, the operations of FIG. 5 are periodically repeated, in some embodiments. In this manner, the base station selection method 200 regularly obtains the current condition of the mobile device 50 with the wireless neighborhood 100B and updates its serving base station, as needed.

Implicit in the operations illustrated in FIG. 5 for the simplified wireless neighborhood 100B of FIG. 4 is knowing the location of the mobile device 50. Where a choice may be made between a macro cell 30 or a pico cell 40 as the serving base station, the base station selection method 200 nevertheless wants to select base stations that are closest to the mobile device 50.

In some embodiments, the base station selection method 200 also considers the mobility of the device 50. The mobility includes not just knowing the current location of the device 50, but also how quickly or slowly the device is traveling through the wireless neighborhood 100. The base station selection method 200 is capable of performing mobility estimation 205 (FIG. 3) of the mobile device 50.

In some embodiments, the base station selection method 200 allows a slow-mobility mobile device 50 to attach to the pico cells 40 for load balancing and capacity enhancement. For high-mobility mobile device, the base station selection method 200 maintains the connection between the mobile device 50 and the macro cell 30, so as to avoid unnecessary handover and associated signaling overhead on both the radio access network (RAN) and on the core network 80.

One way to achieve such optimized cell selection is to explicitly consider the mobility of the mobile device 50. The base station selection method 200 considers three ways to estimate mobility: using a global positioning system (GPS) or other location service 210, counting previous mobility events 215, and performing physical layer Doppler shift estimation 220.

The location service method 210 may employ widely available GPS or other location service information to estimate the mobility of the mobile device 50. The accuracy of such location services varies widely. For example, certain location-based services may operate using radio measurement and may have a large margin of error. Even so, the accuracy of location services may be improved upon, such as by using a history log and performing window averaging.

The second method employed by the base station selection method 200, counting previous mobility events 215, is a more rough estimation than using the location service method 210, but incurs less processing at the mobile device 50, and may be purely calculated by the network. The previous mobility events that are counted may include handover, location updates, scan reports, and so on.

The third method employed by the base station selection method 200, physical layer Doppler shift estimation 220, may be done using a tuned physical layer algorithm. From this, the mobility of the mobile device 50 may be estimated from a Doppler shift measurement taken of the channel in which transactions between the mobile device and the serving base station take place.

Once the mobility estimation is available, the base station selection method 200 may decide whether or not to allow the mobile device 50 to be handed over from a macro cell 30 to a pico cell 40, even if the pico cell is currently available (and perhaps even closer) to the mobile device. Where high mobility users incur many handover operations, this may cause an increase in the signaling load of the network. In such situations, the base station selection method 200 may keep the high-speed mobile device 50 maintaining a connection to a macro cell 30 rather than moving to a pico cell 40.

Figure 6:
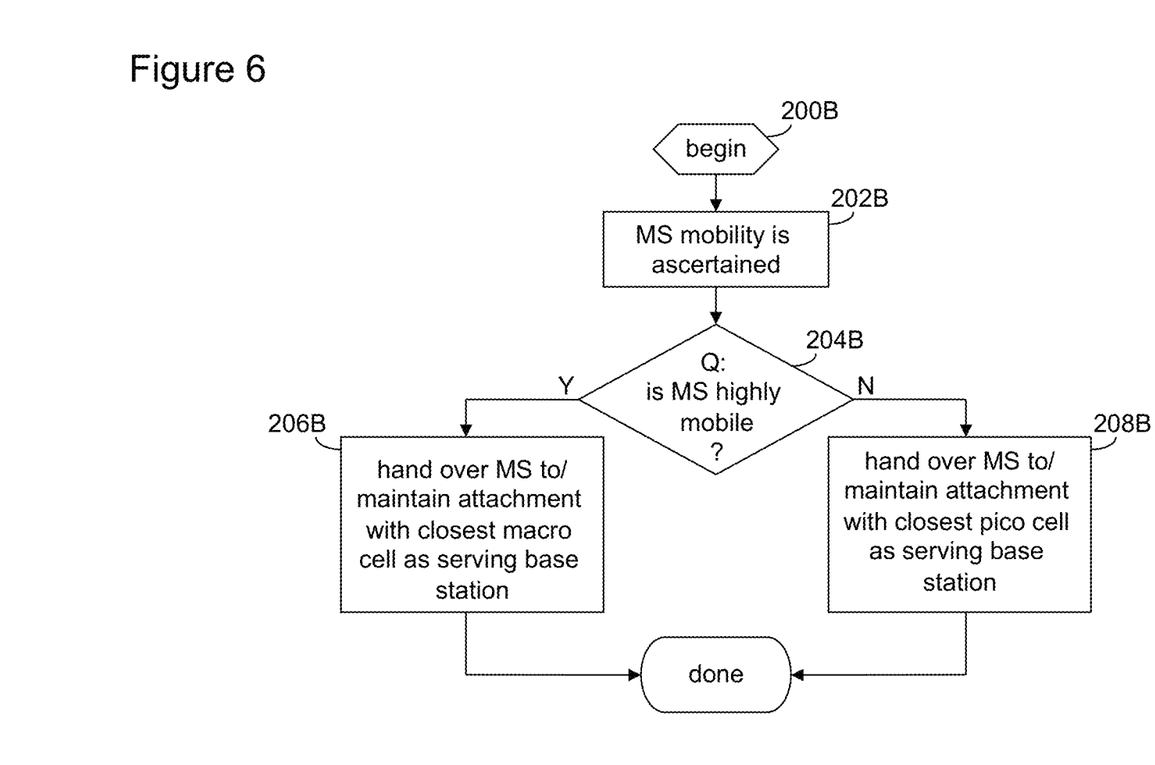
FIG. 6 is a flow diagram illustrating operations performed by the base station selection method of FIG. 2 in determining mobility of a mobile device, according to some embodiments.

FIG. 6 is a flow diagram illustrating operations of the base station selection method 200 in selecting a serving base station based on the mobility of the mobile device 50, according to some embodiments. The base station selection method 200 obtains the mobility information about the mobile device 50 (block 202B), such as using one of the mechanisms described above and illustrated in FIG. 3. If the mobile device 50 is determined to be highly mobile (block 204B), the base station selection method 200 either hands the mobile device over to or maintains its attachment to the macro cell 30 (block 206B). Since the mobile device 50 is traveling through the wireless neighborhood 100 at a high rate of speed, it does not make much sense to hand the device over to a pico cell 40, then again to a macro cell 30, then again to a pico cell 40, with only its location, or, similarly, only signal strength relative to these base stations being considered. Instead, by maintaining connection to the macro cell 30 when the mobile device 50 is highly mobile, unnecessary handover and signaling overhead is avoided for the network 80.

Where the mobile device 50 is deemed a low-mobility device (block 204B), the base station selection method 200 either maintains attachment to or hands the device over to the nearest pico cell 40 (block 208B) as its serving base station. Where the mobile device 50 is first attached to a pico cell 40, the base station selection method 200 hands the device over to a macro cell 30 only where it is deemed highly mobile. The threshold for high mobility versus low mobility is determined by network operators on a case-by-case basis, and may change depending on the traffic in the wireless neighborhood 100, on the network 80, and other considerations.

The same design goal of the base station selection method 200 may be achieved in combination with mobility estimation, or even without mobility estimation, by defining mobility adaptive triggers. For example, if the base station selection method 200 wants to ensure the mobile device 50 is indeed remaining supported by the pico cell 40 having low mobility, the base station selection method 200 will configure the measurement period for this cell to average over a long enough window and only allow handover if its measurement is good enough and also varies insignificantly over time. Thus, as one example, the base station selection method 200 may obtain several measurements of the mobile device 50 over a one-minute time period. If the average of these measurements does not vary and remains high enough, then the mobile device 50 is assumed to be stationary or substantially stationary within the pico cell coverage area. Such a configuration may be mobile device-specific (as in LTE) or target-cell specific (as in WiMAX). If the mobile device 50 is deemed to be a low-mobility device, the configured cell-specific measurement will automatically classify the target pico cell 40 as a good candidate for handover, whereas, if the mobile station is deemed high-mobility, the measurement will indicate the pico cell 40 is not a good candidate for handover.

Where the base station selection method 200 is executed in the mobile station 50, to reduce mobile station complexity in terms of managing too many concurrent cell selection rules, where the network 80 is configured to optimize low mobility with a default rule already defined in the mobile station, e.g., provisioned in the device, the base station selection method 200 may choose to only configure special high-mobility optimization rules for high-mobility users. On the other hand, the network 80 may be configured to optimize high mobility, in which case the base station selection method 200 would configure special low-mobility optimization rules for low-mobility users. Thus, the base station selection method 200 is optimized depending on the characteristics of the network 80 in which the mobile device 50 operates.

A problem similar to the one being solved by the base station selection method 200 is identified in U.S. patent application Ser. No. 12/494,145, filed on Jun. 29, 2009, entitled, "Dual Base Stations for Wireless Communication Systems" (hereinafter, "dual base stations case"). In the dual base stations case, an idealized solution is proposed in which the mobile device 50 receives a downlink operation from a macro cell 30 while transmitting uplink operations to a pico cell 40. Such "dual attach access points" proposed by the dual base stations case is quite demanding on signaling channel design and network coordination.

Instead, the base station selection method 200 is a simplified approach, because, in contrast to the dual base stations case, the current network architecture and mobile device behavior remain unchanged. The base station selection method 200 makes a decision on finding a single point of attachment for the mobile device 50, based on its need. In some embodiments, the base station selection method 200 includes one or a combination of the following input factors in determining whether to perform a handover of the mobile device to a different serving base station: battery level indication, traffic demands, and load balancing.

Battery level indication is available to the network under the advanced air interface (802.16m). Thus, the battery level of the mobile device 50, which supports the advanced air interface, is ascertainable. When the battery level of the mobile device 50 is low, the base station selection method 200 may prefer to allow the mobile station to select a pico cell 40 as its attachment point, as shown above in FIG. 5.

The base station selection method 200 may monitor or obtain traffic information of the mobile device. If the mobile device 50 is mainly performing download operations and has a high quality of service (QoS) requirement (relative to throughput), the base station selection method 200 may prefer to maintain attachment of the mobile device to the macro cell 30. If the mobile device 50 is mainly performing upload operations, then the base station selection method 200 may prefer to move its attachment to the pico cell 40 as its serving base station.

Figure 7:
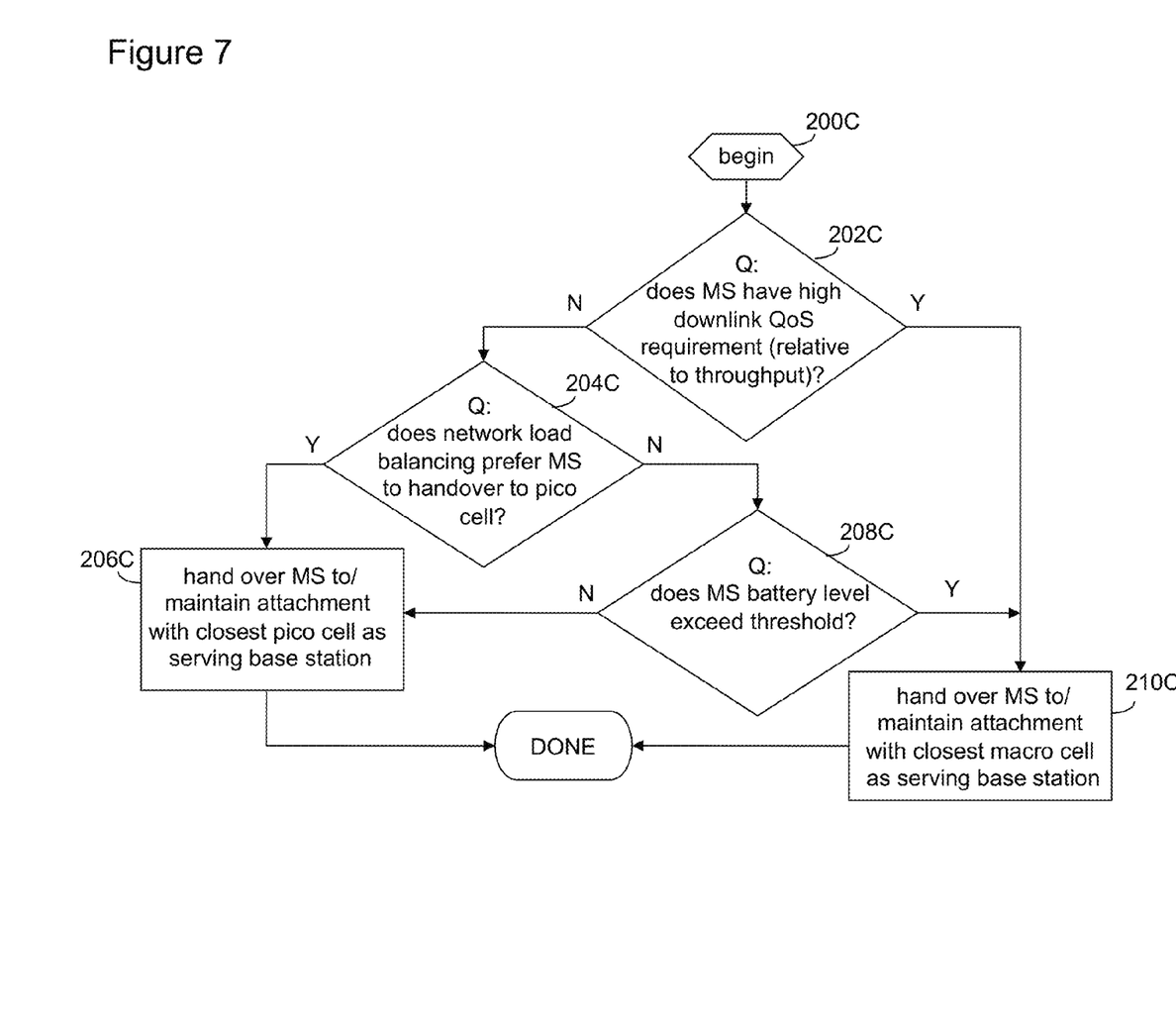
FIG. 7 is a flow diagram illustrating operations performed by the base station selection method of FIG. 2 in performing nuanced cell selection, according to some embodiments.

As with battery level indication and traffic information, the base station selection method 200 may also be influenced by the need to balance the load of the network 80. FIG. 7 is a flow diagram depicting operations of the base station selection method 200 in weighing these factors before deciding whether the serving base station of the mobile device 50 should be changed or not.

The base station selection method 200 determining whether the mobile device 50 has a high downlink quality of service requirement relative to throughput (block 202C). If so, either the serving base station is changed from a pico cell to the nearest macro cell or the attachment to the macro cell 40 is maintained (block 210C). Otherwise, the base station selection method 200 determines whether a pico cell 40 or a macro cell 30 as the serving base station would be called for under network load balancing analysis (block 204C). If network load balancing calls for moving from a macro cell 30 to a pico cell 40, the mobile device 50 is handed over to the nearest pico cell (block 206C) as its new serving base station. Otherwise, the base station selection method 200 analyzes the battery level of the mobile device 50. If the battery level does not exceed some predetermined threshold (block 208C), then the battery level is low, necessitating that the mobile device 50 stay attached to or be handed over to the nearest pico cell 40 (block 208D). Where the battery life of the mobile device 50 exceeds the predetermined threshold, attachment or handover to the macro cell 30 occurs (block 210C).

As explained above, the macro cells 30 and pico cells 40 may employ different radio access technology (RAT). Depending on deployment and network connectivity, the optimizations of the base station selection method 200 described above may be applicable for a more general heterogeneous network case.

Returning to FIG. 1, the base stations 30A, 30C, 40C, and 40D are from a first RAT while the base stations 30B, 40A, and 40B are from a second RAT. In such a multi-RAT configuration, the "dual access provider" approach in the dual base stations case is actually more realistic than maintaining connectivity with two physical access points of the same radio access technology in the network (since most current network architectures do not support this). Current mobile devices typically have multiple radios, such as Bluetooth, WiFi, GSM (global system for mobile communications) 3G (third generation) and 4G (fourth generation) devices.

Further, the mobile device 50 may have multiple concurrent connections running on different RATs, a possibility that was not considered in the dual base stations case. For example, if the mobile device 50 has both WiMAX and WiFi radio simultaneously enabled, the mobile device may direct traffic with strong quality of service (QoS) requirements (e.g., in terms of latency or guaranteed bit rate) onto a WiMAX network, while directing best-effort traffic onto its Wifi network, thus prolonging the battery life of the mobile device.

Such an operation is possible today via user manual input. The base station selection method 200 allows mobile station implementation or network operation to automatically configure radio selection based on the above considerations, such that the base station selection is geared to optimize the user experience or the network operation (or both) instead of a selection being made purely from user personal preference.

Currently, mobility in heterogeneous networks is not fully optimized in today's WiMAX or LTE network. The current 4G network is optimized for single tier (macro cells only) network, assuming that most users are of low mobility. There are no specifications to enable mobility triggers that differentiates different cell types or different mobility properties of the mobile device 50.

The base station selection method 200 thus determines whether to perform a handover of a mobile device 50 between a macro cell 30 and a pico cell 40 based on an estimation of the mobile station's mobility, the battery life of the mobile station, whether the transmission is uplink or downlink, and multiple access provider association in a heterogeneous overlay network.

In the IEEE 802.16m advanced air interface standard, multiple companies introduced the concept of a cell-specific handover trigger. The motivation at that time was to trigger a fast handover to a pico cell that is covering a coverage hole. The original cell-specific handover trigger did not consider overlay handover optimization. The base station selection method 200, by contrast, is dedicated to optimizing handover operations in a heterogeneous overlay network such as the wireless neighborhood 100 in FIG. 1.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method to select a serving base station of a mobile device traveling through a wireless neighborhood, the serving base station to be connected to a network, the method comprising:
  checking, by a server system operable in the wireless neighborhood, the battery level of the mobile device, wherein the serving base station of the mobile device is either a macro cell that supports high-mobility devices or a pico cell that provides low-mobility coverage on the network;
  if the battery level does not exceed a predetermined threshold, selecting, by the server system, the pico cell as the serving base station of the mobile device, wherein the pico cell is the nearest to the mobile device of a plurality of pico cells in the wireless neighborhood;
  if the battery level does exceed the predetermined threshold, determining, by the server system, whether the mobile device is mostly receiving downlink transactions from or sending uplink transactions to the serving base station; and
  if the mobile device is mostly receiving downlink transactions from the serving base station, selecting, by the server system, the marco cell as the serving base station of the mobile device, wherein the macro cell is the nearest to the mobile device of a plurality of macro in the wireless neighborhood.

2. The method of claim 1, further comprising:
  if the mobile device is mostly sending uplink transactions to the serving base station, selecting, by the server system, the pico cell as the serving base station of the mobile device in the wireless neighborhood.

3. The method of claim 1, further comprising:
  if the plurality of macro cells uses a first radio access technology (RAT) and the plurality of pico cells uses a second RAT; and
  if the mobile device has both the first RAT and the second RAT simultaneously enabled, then the mobile device directs traffic with strong quality of service requirements onto the nearest macro cell employing the first RAT while directing best-effort traffic onto the nearest pico cell employing the second RAT, such that the mobile device maintains two concurrent connections to two different base stations, wherein the dual connection of the mobile device to two different RATs prolongs the battery life of the mobile device.

4. The method of claim 1, further comprising:
  if the plurality of macro cells uses a first radio access technology (RAT) and the plurality of pico cells uses a second RAT; and
  if the mobile device has both the first RAT and the second RATs simultaneously enabled, then
  analyzing, by the server system, the network based on mobility, traffic pattern, and load balancing; and
  selecting, by the server system, the nearest macro cell employing the first RAT as the serving base station of the mobile device based on the network analysis.

5. A method to select a serving base station of a mobile device traveling through a wireless neighborhood, the serving base station to be connected to a network, the method comprising:
  checking, by the mobile device, the battery level of the mobile device, wherein the serving base station of the mobile device is either a macro cell that supports high-mobility devices or a pico cell that provides low-mobility coverage on the network;
  if the battery level does not exceed a predetermined threshold, selecting, by the mobile device, the pico cell as the serving base station of the mobile device, wherein the pico cell is the nearest to the mobile device of a plurality of pico cells in the wireless neighborhood;
  if the battery level does exceed the predetermined threshold, determining, by the mobile device, whether the mobile device is mostly receiving downlink transactions from or sending uplink transactions to the serving base station; and
  if the mobile device is mostly receiving downlink transactions from the serving base station, selecting, by the mobile device, the macro cell as the serving base station of the mobile device, wherein the macro cell is the nearest to the mobile device of a plurality of macro cells in the wireless neighborhood.

6. The method of claim 5, further comprising:
  if the mobile device is mostly sending uplink transactions to the serving base station, selecting, by the mobile device, the pico cell as the serving base station of the mobile device in the wireless neighborhood.

7. The method of claim 5, further comprising:
  if the plurality of macro cells uses a first radio access technology (RAT) and the plurality of pico cells uses a second RAT; and
  if the mobile device has both the first RAT and the second RAT simultaneously enabled, then the mobile device directs traffic with strong quality of service requirements onto the nearest macro cell employing the first RAT while directing best-effort traffic onto the nearest pico cell employing the second RAT, such that the mobile device maintains two concurrent connections to two different base stations, wherein the dual connection of the mobile device to two different RATs prolongs the battery life of the mobile device.

8. The method of claim 5, further comprising:
  if the plurality of macro cells uses a first radio access technology (RAT) and the plurality of pico cells uses a second RAT; and
  if the mobile device has both the first RAT and the second RAT simultaneously enabled, then
  analyzing, by the mobile device, the network based on mobility, traffic pattern, and load balancing; and
  selecting, by the mobile device, the nearest macro cell employing the first RAT as the serving base station of the mobile device based on the network analysis.

9. A method to select a serving base station of a mobile device traveling through a wireless neighborhood, the serving base station to be connected to a network, the method comprising:
  checking, by a base station entity operating in the wireless neighborhood, the battery level of the mobile device, wherein the serving base station of the mobile device is either a macro cell that supports high-mobility devices or a pico cell that provides low-mobility coverage on the network;

if the battery level does not exceed a predetermined threshold, selecting, by the base station entity, the pico cell as the serving base station of the mobile device, wherein the pico cell is the nearest to the mobile device of a plurality of pico cells in the wireless neighborhood;

if the battery level does exceed the predetermined threshold, determining, by the base station entity, whether the mobile device is mostly receiving downlink transactions from or sending uplink transactions to the serving base station; and if the mobile device is mostly receiving downlink transactions from the serving base station, selecting, by the base station, the macro cell as the serving base station of the mobile device, wherein the macro cell is the nearest to the mobile device of a plurality of macro cells in the wireless neighborhood.

10. The method of claim 9, further comprising:
if the mobile device is mostly sending uplink transactions to the serving base station, selecting, by the base station entity, the pico cell as the serving base station of the mobile device in the wireless neighborhood.

11. The method of claim 9, further comprising:
if the plurality of macro cells uses a first radio access technology (RAT) and the plurality of pico cells uses a second RAT; and
if the mobile device has both the first RAT and the second RAT simultaneously enabled, then the mobile device directs traffic with strong quality of service requirements onto the nearest macro cell employing the first RAT while directing best-effort traffic onto the nearest pico cell employing the second RAT, such that the mobile device maintains two concurrent connections to two different base stations, wherein the dual connection of the mobile device to two different RATs prolongs the battery life of the mobile device.

12. The method of claim 9, further comprising:
if the plurality of macro cells uses a first radio access technology (RAT) and the plurality of pico cells uses a second RAT; and
if the mobile device has both the first RAT and the second RAT simultaneously enabled, then
analyzing, by the base station entity, the network based on mobility, traffic pattern, and load balancing; and
selecting, by the base station entity, the nearest macro cell employing the first RAT as the serving base station of the mobile device based on the network analysis.

13. The method of claim 9, wherein the base station entity is the serving base station.

14. The method of claim 9, wherein the base station entity is the serving base station and a second base station operating in the wireless neighborhood.

15. The method of claim 9, wherein the base station entity is the serving base station and a plurality of base stations operating in the wireless neighborhood.

* * * * *